ical filter 130 RGBIR sensor 140 processing unit
United States Patent

Pu et al.

(10) Patent No.: US 11,057,592 B2
(45) Date of Patent: Jul. 6, 2021

(54) IMAGE DEFOGGING METHOD AND IMAGE CAPTURE APPARATUS IMPLEMENTING IMAGE DEFOGGING

(71) Applicant: Hangzhou Hikvision Digital Technology Co., Ltd., Zhejiang (CN)

(72) Inventors: Shiliang Pu, Zhejiang (CN); Hai Yu, Zhejiang (CN); Meng Fan, Zhejiang (CN)

(73) Assignee: Hangzhou Hikvision Digital Technology Co., Ltd.

( * ) Notice: Subject to any disclaimer, the term of this patent is extended or adjusted under 35 U.S.C. 154(b) by 267 days.

(21) Appl. No.: 16/303,757

(22) PCT Filed: Feb. 13, 2017

(86) PCT No.: PCT/CN2017/073347
§ 371 (c)(1),
(2) Date: Nov. 21, 2018

(87) PCT Pub. No.: WO2017/202061
PCT Pub. Date: Nov. 30, 2017

(65) Prior Publication Data
US 2020/0322580 A1 Oct. 8, 2020

(30) Foreign Application Priority Data

May 25, 2016 (CN) .......................... 201610355946.9

(51) Int. Cl.
*H04N 5/235* (2006.01)
*H04N 9/04* (2006.01)
(Continued)

(52) U.S. Cl.
CPC ....... *H04N 9/04515* (2018.08); *H04N 5/2254* (2013.01); *H04N 5/2353* (2013.01); *H04N 9/735* (2013.01)

(58) Field of Classification Search
CPC ........... H04N 5/332; G06T 5/007; G06T 7/30; G06T 5/235; G06K 9/00
See application file for complete search history.

(56) References Cited

U.S. PATENT DOCUMENTS

| 4,651,001 A * | 3/1987 | Harada ............. H01L 27/14618 250/330 |
| 7,649,547 B2 * | 1/2010 | Kogane ................ H04N 5/2352 348/143 |

(Continued)

FOREIGN PATENT DOCUMENTS

| CN | 103118229 A | 5/2013 |
| CN | 104683767 A | 6/2015 |

(Continued)

OTHER PUBLICATIONS

A general framework for multiresolution image fusion; Piellas; 2003. (Year: 2003).*

(Continued)

*Primary Examiner* — Luis Perez-Fuentes
(74) *Attorney, Agent, or Firm* — Mark E. Bandy; Rankin Hill & Clark, LLP (57) ABSTRACT

Embodiments of the present application disclose an image dehazing method and an image acquiring apparatus implementing image dehazing. In the embodiments of the present application, an RGBIR sensor can be adopted to generate a first RGBIR image and a second RGBIR image, such that the generated images are color images and contain infrared information; thus a finally generated image thus has a good dehazing effect; in addition, the image acquiring apparatus adjusts the first exposure time length and the second exposure time length based on the first RGBIR image and the second RGBIR image generated during each exposure, causing the RGB components and the IR component in the (Continued)

image to be balanced, which guarantees the display effect of the finally generated dehazed image.

18 Claims, 4 Drawing Sheets

(51) Int. Cl.
*H04N 5/225* (2006.01)
*H04N 9/73* (2006.01)

(56) References Cited

U.S. PATENT DOCUMENTS

| | | | | |
|---|---|---|---|---|
| 8,749,635 B2* | 6/2014 | Hogasten | ............... | H04N 5/33 348/164 |
| 9,285,309 B2* | 3/2016 | Choi | ............... | G01N 21/359 |
| 9,692,991 B2* | 6/2017 | Zhang | ............... | H04N 5/332 |
| 10,354,366 B2* | 7/2019 | Toda | ............... | H04N 9/0451 |
| 10,425,595 B2* | 9/2019 | Frank | ............... | H04N 5/33 |
| 10,523,856 B2* | 12/2019 | Shukla | ............... | H04N 5/2351 |
| 2005/0140942 A1* | 6/2005 | Squires | ............... | H04N 5/913 353/122 |
| 2011/0001814 A1* | 1/2011 | Yamanaka | ......... | G06K 9/00033 348/78 |
| 2013/0188057 A1 | 7/2013 | Lin | | |
| 2013/0329101 A1 | 12/2013 | Choi et al. | | |
| 2014/0218538 A1 | 8/2014 | Choi | | |
| 2019/0318463 A1* | 10/2019 | Zhang | ............... | G06T 5/10 |
| 2020/0322580 A1* | 10/2020 | Pu | ............... | G06T 3/4015 |

FOREIGN PATENT DOCUMENTS

| | | |
|---|---|---|
| CN | 104735347 A | 6/2015 |
| CN | 105144688 | 12/2015 |
| EP | 0777149 A3 | 6/1997 |
| EP | 2711730 A1 | 3/2014 |
| JP | H10230805 A | 9/1998 |

OTHER PUBLICATIONS

Near-Infrared Guided Color Image Dehazing; Feng et al; 2013. (Year: 2013).*
A fast video image defogging algorithm based on dark channel prior; 2013. (Year: 2013).*
An adaptive and effective single image dehazing algorithm based on dark channel prior; Zhu; 2013. (Year: 2013).*
Extended European Search Report dated Apr. 29, 2019; Application No. EP 17801917.0; 12 pages.

* cited by examiner

IMAGE DEFOGGING METHOD AND IMAGE CAPTURE APPARATUS IMPLEMENTING IMAGE DEFOGGING

The present application claims the priority to a Chinese patent application No. 201610355946.9 filed with the China National Intellectual Property Administration on May 25, 2016 and entitled "IMAGE DEFOGGING METHOD AND IMAGE CAPTURE APPARATUS IMPLEMENTING IMAGE DEFOGGING", which is incorporated herein by reference in its entirety.

TECHNICAL FIELD

The present application relates to the field of image processing, and more particularly to an image dehazing method and an image acquiring apparatus implementing image dehazing.

BACKGROUND

Security surveillance systems may be applied to protect the security of important places such as preventing personnel invasion, monitoring traffic security, etc., and applied for incident tracking. However, in severe weathers such as rain, heavy fog, and smog, a reduced visibility results in a poor visual display effect of images acquired by a security surveillance system. Therefore, how to acquire a clear image through such severe weathers becomes a practical and significant issue.

Currently, relevant image dehazing methods mainly adopt an optical dehazing method. According to this method, a visible light band containing considerable invalid information is filtered out using an optical filter; while only an infrared light band having a strong haze-through capability is acquired, thereby obtaining an infrared image with a sharper contrast.

However, this method is mainly carried out through optical filters, which needs more optical filters; besides, a need of switching between multiple optical filters results in a relatively complex structure. Additionally, an image obtained through this method is a black-and-white grayscale image, and a true color image of a scene under surveillance cannot be obtained, causing a poor display effect.

SUMMARY

Embodiments of the present application disclose an image dehazing method and an image acquiring apparatus implementing image dehazing, so as to solve the issue of poor image dehazing effect.

According to a first aspect, an embodiment of the present application provides an image acquiring apparatus implementing image dehazing, including:
  a lens, configured to converge visible light and infrared light;
  an optical filter, configured to filter the converged visible light and infrared light to filter out a near-infrared visible transition band from the visible light and infrared light;
  an RGBIR sensor, configured to sense the filtered visible light and the filtered infrared light according to a first exposure time length stored during one exposure or multiple exposures in a round of exposure process, to generate a first RGBIR image; and sense the filtered visible light and the filtered infrared light according to a second exposure time length stored during another exposure or other multiple exposures in the round of exposure process, to generate a second RGBIR image; wherein the first exposure time length and the second exposure time length is either identical or different;
  a processor, configured to remove the infrared IR component from the first RGBIR image, to obtain an average luminance of an RGB image corresponding to the first RGBIR image; remove the RGB components from the second RGBIR image to obtain an average luminance of an IR image corresponding to the second RGBIR image; and adjust the first exposure time length according to the average luminance of the RGB image and a first target luminance value preconfigured; and adjust the second exposure time length according to the average luminance of the IR image and a second target luminance value preconfigured; and transmit the adjusted exposure time lengths to the RGBIR sensor, and generate a dehazed image based on the first RGBIR image and the second RGBIR image.

Optionally, the near-infrared visible light transition band refers to a band ranging from 600 nm to 1000 nm.

Optionally, the processor is configured to, use an interpolation method to determine an interpolated IR luminance value of an image element in the first RGBIR image, wherein the image element includes each image element of R component, G component, B component in the first RGBIR image corresponding to the image element of the IR component, and subtract the interpolated IR luminance value from the luminance value of the image element, to obtain an adjusted luminance value of the image element; and determine an average luminance of the RGB image corresponding to the first RGBIR image based on the adjusted luminance value of each image element of R component, G component, B component.

Optionally, the processor is configured to, determine a white balance gain of the RGB image, and generate the dehazed image based on the white balance gain of the RGB image, the first RGBIR image and the second RGBIR image.

Optionally, the processor is configured to, shorten the first exposure time length if the first difference value between the average luminance of the RGB image and the first target luminance value is greater than a first threshold; or prolong the first exposure time length when the first difference value is smaller than a second threshold, wherein the first threshold is greater than the second threshold.

Optionally, the processor is configured to, shorten the first exposure time length with a first step size, or prolong the first exposure time length with a second step size, wherein the first step size and the second step size is either identical or different.

Optionally, the processor is configured to, shorten the second exposure time length if the second difference value between the average luminance of the IR image and the second target luminance value is greater than a third threshold; or prolong the second exposure time length when the second difference value is smaller than a fourth threshold, wherein the third threshold is greater than the fourth threshold.

Optionally, wherein the processor is configured to, shorten the second exposure time length with a third step size, or prolong the second exposure time length with a fourth step size, wherein the third step size and the fourth step size is either identical or different.

According to a second aspect, an embodiment of the present application provides an image dehazing method, which is applied to an image acquiring apparatus, the method including:

receiving each first RGBIR image and each second RGBIR image transmitted by an RGBIR sensor, wherein the first RGBIR image is generated by the RGBIR sensor through sensing the filtered visible light and the filtered infrared light according to a first exposure time length stored during one exposure or multiple exposures in a round of exposure process; and the second RGBIR image is generated by the RGBIR sensor through sensing the filtered visible light and the filtered infrared light according to a second exposure time length stored during another exposure or other multiple exposures in the round of exposure process; wherein the first exposure time length and the second exposure time length is either identical or different, and the filtered visible light and the filtered infrared light are obtained by filtering out a near-infrared visible light transition band from converged visible light and infrared visible light; and removing the infrared IR component from the first RGBIR image to obtain an average luminance of an RGB image corresponding to the first RGBIR image; removing the RGB components from the second RGBIR image to obtain an average luminance of an IR image corresponding to the second RGBIR image; and adjusting the first exposure time length according to the average luminance of the RGB image and a first target luminance value preconfigured; adjusting the second exposure time length according to the average luminance of the IR image and a second target luminance value preconfigured; and transmitting the adjusted exposure time lengths to the RGBIR sensor, and generating a dehazed image based on the first RGBIR image and the second RGBIR image.

Optionally, the near-infrared visible light transition band refers to a band ranging from 600 nm to 1000 nm.

Optionally, removing the infrared IR component from the first RGBIR image to obtain an average luminance of an RGB image corresponding to the first RGBIR image, including:

determining an interpolated IR luminance value of an image element in this first RGBIR image using an interpolation method, wherein the image element includes each image element of R component, G component, B component in the first RGBIR image corresponding to the image element of the IR component;

subtracting the interpolated IR luminance value from the luminance value of the image element, to obtain an adjusted luminance value of the image element; and determining an average luminance of the RGB image corresponding to the first RGBIR image based on the adjusted luminance value of each image element of R component, G component, B component.

Optionally, determining an average luminance of the RGB image corresponding to the first RGBIR image based on the adjusted luminance value of each image element of R component, G component, B component, includes:

determining an average luminance of the RGB image corresponding to each first RGBIR image based on the adjusted luminance value of each image element of R component, G component, B component and a preconfigured weight value corresponding to the image element.

Optionally, generating a dehazed image based on the first RGBIR image and the second RGBIR image including:

determining a white balance gain of each RGB image, and generating the dehazed image based on the white balance gain of the RGB image, the first RGBIR image and the second RGBIR image.

Optionally, adjusting the first exposure time length according to the average luminance of the RGB image and a first target luminance value preconfigured includes:

shortening the first exposure time length if the first difference value between the average luminance of the RGB image and the first target luminance value is greater than a first threshold; or prolonging the first exposure time length when the first difference value is smaller than a second threshold, wherein the first threshold is greater than the second threshold.

Optionally, the first exposure time length is shortened with a first step size, or the first exposure time length is prolonged with a second step size, wherein the first step size and the second step size is either identical or different.

Optionally, adjusting the second exposure time length according to the average luminance of the IR image and a second target luminance value preconfigured includes:

shortening the second exposure time length if the second difference value between the average luminance of the IR image and the second target luminance value is greater than a third threshold; or prolonging the second exposure time length when the second difference value is smaller than a fourth threshold, wherein the third threshold is greater than the fourth threshold.

Optionally, the second exposure time length is shortened with a third step size, and the second exposure time length is prolonged with a fourth step size, wherein the third step size and the fourth step size is either identical or different.

According to a third aspect, the present application provides a storage medium, wherein the storage medium is configured for storing executable codes, the executable codes are configured for implementing the image dehazing method of the present application when being executed.

According to a fourth aspect, the present application provides an application, wherein the application is configured for implementing the image dehazing method according to the present application when being executed.

Embodiments of the present application provide an image dehazing method and an image acquiring apparatus implementing image dehazing, wherein the optical filter in the image acquiring apparatus filters visible light and infrared light converged by a lens to filter out a near-infrared visible light transition band from the visible light and infrared light; the RGBIR sensor, during one exposure or multiple exposures in a round of exposure process, generates a first RGBIR image according to a first exposure time length, and generates, during another exposure or other multiple exposures in the round of exposure process, a second RGBIR image according to a second exposure time length; the processor adjusts the first exposure time length of the RGBIR sensor based on the average luminance of the RGB image corresponding to the first RGBIR image and a first target luminance value preconfigured, adjusts the second exposure time length of the RGBIR sensor based on the average luminance of the IR image corresponding to the second RGBIR image and a second target luminance value preconfigured, and generates a dehazed image according to the first RGBIR image and the second RGBIR image. Because the embodiments of the present application adopt an RGBIR sensor to generate the first RGBIR image and the second RGBIR image, the generated images are color images and contain infrared information, such that the finally generated image has a good dehazing effect; additionally, the image acquiring device adjusts the first exposure time length and the second exposure time length based on the first RGBIR image and the second RGBIR image generated during each exposure, causing the RGB components and the IR component in the image to be balanced, which guarantees the display effect of the finally generated dehazed image.

BRIEF DESCRIPTION OF THE DRAWINGS

To illustrate the technical solutions of the embodiments of the present application and prior art more clearly, the drawings that need to be used in the embodiments and prior art will be briefly introduced below. To those of normal skill in the art, other drawings may be obtained according to these figures without exercise of inventive work.

DETAILED DESCRIPTION

In order to make those skilled in the art better understand the technical solutions in the embodiments of the present application, the technical solutions in the embodiments of the present application will be described in a clear and complete way in conjunction with the accompanying drawings in the embodiments of the present application. It is apparent that the embodiments as described are only part of embodiments of the present application, not all of them. Based on the embodiments in the present application, all other embodiments obtained by those of normal skill in the art without exercise of inventive work belong to the protection scope of the present application.

It needs to be noted that without conflict, the embodiments in the present application and the features in the embodiments may be combined with one another. Hereinafter, the present application will be described in detail with reference to the accompanying drawings in conjunction with the embodiments.

Figure 1:
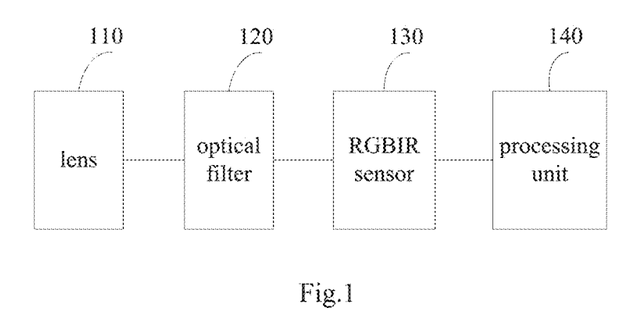
FIG. 1 is a structural schematic diagram of an image acquiring apparatus implementing image dehazing provided in an embodiment of the present application.

To enhance the display effect of a generated dehazed image, an embodiment of the present application provides an image acquiring apparatus implementing image dehazing. As shown in FIG. 1, the apparatus may include: a lens 110, an optical filter 120, an RGBIR sensor 130, and a processor 140; wherein, the lens 110 is configured to converge visible light and infrared light;

the optical filter 120 is configured to filter the converged visible light and infrared light to filter out a near-infrared visible light transition band from the visible light and infrared light;

the RGBIR sensor 130 is configured to sense the filtered visible light and the filtered infrared light according to a first exposure time length stored during one exposure or multiple exposures in a round of exposure process, to generate a first RGBIR image; and sense the filtered visible light and the filtered infrared light according to a second exposure time length stored during another exposure or other multiple exposures in the round of exposure process, to generate a second RGBIR image; wherein the first exposure time length and the second exposure time length is either identical or different;

the processor 140 is configured to remove the infrared IR component from the first RGBIR image, to obtain an average luminance of an RGB image corresponding to the first RGBIR image; remove the RGB components from the second RGBIR image to obtain an average luminance of an IR image corresponding to the second RGBIR image; and adjust the first exposure time length according to the average luminance of the RGB image and a first target luminance value preconfigured; and adjust the second exposure time length according to the average luminance of the IR image and a second target luminance value preconfigured; and transmit the adjusted exposure time lengths to the RGBIR sensor, and generate a dehazed image based on the first RGBIR image and the second RGBIR image.

In an embodiment of the present application, the lens 110 may be any kind of existing optional lens that can converge the visible light and infrared light. The embodiments of the present application have no limitation thereto.

In an embodiment of the present application, to enhance the display effect of the generated dehazed image, the optical filter 120 can be provided in the image acquiring apparatus. The optical filter 120 can be configured to filter the visible light and infrared light converged by the lens 110 to filter out a near-infrared visible light transition band from the visible light and infrared light. Particularly, the near-infrared visible light transition band may be a band ranging from 600 nm to 1000 nm.

Specifically, the optical filter 120 may be an independent lens; or, in some embodiments, the lens 110 may be coated using a film coating technology, thereby integrating a function of the optical filter 120.

In an embodiment of the present application, the RGBIR sensor 130 may be an existing RGBIR sensor. The RGBIR sensor is an image sensor and also a CMOS sensor. Different from a traditional image sensor that outputs Bayer pattern data, the RGBIR sensor 130 transforms part of red-blue or green-through image elements into infrared-through image elements, thereby sacrificing part of color channel information for an independent channel near-infrared (with a sensible wavelength about 800-1000 nm) information.

Figure 2:
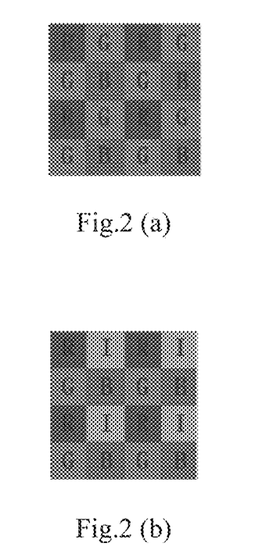
FIG. 2(a) is an image lattice diagram of Bayer pattern data outputted by a traditional image sensor.
FIG. 2(b) is an image lattice diagram outputted by an RGBIR sensor.

As shown in FIGS. 2(a) and 2(b), FIG. 2(a) is a diagram of image lattice of Bayer pattern data outputted by a traditional image sensor, wherein R, G, and B represent red, green, and blue image elements, respectively. FIG. 2(b) is a diagram of RGBIR image lattice outputted by an RGBIR sensor, where R. G, B represent red, green, and blue image elements, respectively, and I represents an infrared photosensitive image element.

In an embodiment of the present application, to enhance the display effect of the generated dehazed image, an image may be generated using a HDR/WDR (High Dynamic Range/Wide Dynamic Range) method. When acquiring an image containing a scene with a relatively large dynamic range, some local patches in the image may be too dark, while some other local patches may be overexposed. Therefore, to obtain a fine image, two or more images having a same photographed scene but different luminance degrees may be obtained through two or more exposures with different time lengths during one round of exposure process. Because each exposure has a different time length, ideal information content may be obtained based on local features of different luminance degrees in respective images. Then, by combining the information contained in the images, a final image with extended dynamic range and enhanced details may be obtained. This method may be referred to as an HDR/WDR image generating method.

Exposure refers to a photoelectric conversion process of an image sensor; during the exposure, an image sensor accepts external light energy, converts it into accumulated charge, and finally converts charge-voltage into a digital image. The longer the exposure time is, the brighter the image is; otherwise, the darker.

Figure 3:
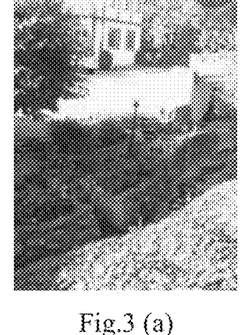
FIG. 3(a)–FIG. 3(c) are schematic diagrams of effects of image composition using an HDR technology.

FIGS. 3(a), 3(b), and 3(c) are schematic diagrams of image composition effects using an HDR technology. FIG. 3(a) is an image exposed with a relatively long exposure time, which shows a local overexposure, i.e., too high luminance at local patches. FIG. 3(b) is an image exposed with a relatively short exposure time, which shows over darkness at local patches, i.e., too low luminance at local patches. It is seen from FIGS. 3(a) and 3(b) that overexposure or over darkness at local patches will cause the image unclear with a poor display effect.

FIG. 3(c) is a final image obtained by image composition using an HDR technology based on the images shown in FIG. 3(a) and FIG. 3(b). As shown in FIG. 3(c), the final image obtained by image composition using the HDR technology has a moderate luminance with a fine image display effect.

In an embodiment of the present application, the RGBIR sensor 130 may pre-save a first exposure time length and a second exposure time length, wherein the first exposure time length and the second exposure time length may be identical or different. Further, the RGBIR sensor 130 may perform more than twice exposures during each round of exposure process according to the stored first exposure time length and second exposure time length. Specifically, the RGBIR sensor 130 may sense the filtered visible light and the filtered infrared light according to a first exposure time length stored during at least one exposure in each round of exposure process, to generate a first RGBIR image, and sense the filtered visible light and the filtered infrared light according to a second exposure time length stored during another exposure or other multiple exposures in the round of exposure process, to generate a second RGBIR image, so as to generate a fine dehazed image using the HDR/WDR image generating method based on the first RGBIR image and the second RGBIR image.

In an embodiment of the present application, the processor 140 is configured to remove, for the first RGBIR image generated by the RGBIR sensor 130, the infrared IR component from the first RGBIR image, to obtain an average luminance of an RGB image corresponding to the first RGBIR image; remove, for each second RGBIR image generated by the RGBIR sensor 130, RGB components from the second RGBIR image, to obtain an average luminance of an IR image corresponding to the second RGBIR image; and adjust the first exposure time length according to the average luminance of the RGB image and a first target luminance value preconfigured; adjust the second exposure time length according to the average luminance of the IR image and a second target luminance value preconfigured; and transmit the adjusted exposure time lengths to the RGBIR sensor 130, and generate the dehazed image based on the first RGBIR image and the second RGBIR image.

As mentioned above, in an embodiment of the present application, the dehazed image may be generated using the HDR/WDR image generating method based on the first RGBIR image and the second RGBIR image generated by the RGBIR sensor 130. During this process, quality of the first RGBIR image and second RGBIR image is an important factor that affects the display effect of the final dehazed image. For example, when the RGB components and the IR component in the image reach a balance, the display effect of the dehazed image may be enhanced. In turn, the first exposure time length and the second exposure time length are important factors affecting the quality of the first RGBIR image and the second RGBIR image. Therefore, in an embodiment of the present application, the processor 140 in the image acquiring apparatus may adjust the first exposure time length and the second exposure time length so as to cause the RGB components and the IR component in the image to be balanced. Moreover, the adjusted first exposure time length and second exposure time length may be transmitted to the RGBIR sensor 130 such that the RGBIR sensor 130 may generate the first RGBIR image and the second RGBIR image according to the adjusted first exposure time length and second exposure time length, thereby enhancing the quality of the first RGBIR image and the second RGBIR image; further, when the processor 140 generates the dehazed image based on the first RGBIR image and the second RGBIR image, the display effect of the dehazed image may be enhanced.

Specifically, the processor 140 may remove, for each first RGBIR image generated by the RGBIR sensor 130, an IR component from the first RGBIR image, to obtain an average luminance of an RGB image corresponding to the first RGBIR image; remove, for each second RGBIR image generated by the RGBIR sensor 130, RGB components from the second RGBIR image, to obtain an average luminance of an IR image corresponding to the second RGBIR image, adjust the first exposure time length according to the average luminance of the RGB image and the preconfigured first target luminance value; and adjust the second exposure time length according to the average luminance of the IR image and the preconfigured second target luminance value.

It needs to be noted that in practical applications, the processor 140 may adjust the corresponding first exposure time length and second exposure time length for the first RGBIR image and the second RGBIR image generated by the RGBIR sensor 130, and transmit the adjusted first exposure time length and second exposure time length to the RGBIR sensor 130; after the RGBIR sensor 130 generates a new first RGBIR image and a new second RGBIR image using the adjusted first exposure time length and second exposure time length, the processor 140 may further adjust the current first exposure time length and second exposure time length according to the new first RGBIR image and second RGBIR image. With this cycle going on and on, both the first exposure time length and the second exposure time length may reach a stable value. Moreover, after the RGBIR sensor 130 generates a first RGBIR image and a second RGBIR image according to the stable first and second exposure time lengths, the RGB components and the IR component in the dehazed image generated by the processor based on the first RGBIR image and the second RGBIR image may reach a balance, thereby achieving a fine display effect.

An embodiment of the present application provides an image acquiring apparatus implementing image dehazing, wherein an optical filter in the image acquiring apparatus filters visible light and infrared light converged by a lens to filter out a near-infrared visible light transition band from the visible light and infrared light; during at least one exposure in each round of exposure process, the RGBIR sensor generates a first RGBIR image based on a first exposure time length and generates a second RGBIR image based on a second exposure time length; the processor adjusts the first exposure time length of the RGBIR sensor according to an average luminance of the RGB image corresponding to the first RGBIR image and a preconfigured first target luminance value, adjusts the second exposure time length of the RGBIR sensor according to the average luminance of the IR image corresponding to the second RGBIR image and a preconfigured second target luminance value, and generates a dehazed image according to the first RGBIR image and the second RGBIR image. Because the RGBIR sensor is adopted in the embodiments of the present application to generate the first RGBIR image and the second RGBIR image, the generated images are color images containing infrared information, thus the finally generated image has a fine dehazing effect. Additionally, the image acquiring apparatus adjusts the first exposure time length and the second exposure time length based on the first RGBIR image and the second RGBIR image generated during each exposure, thereby causing the RGB components and the IR component in the images to reach a balance, which guarantees the display effect of the finally generated dehazed image.

In the visible light and infrared light converged by the lens 110, the spectrum response discrepancies among R, G, B, and IR components in the near-infrared visible light transition band are relatively large, which will affect an energy purity of the first RGBIR image after removing the IR component. In an embodiment of the present application, to further guarantee the dehazing effect of the generated image, the optical filter 120 may be configured for filtering out the near-infrared visible light transition band from the visible light and infrared light.

Specifically, the optical filter 120 may contain an optical filter band with a lower wavelength limit T1 and an upper wavelength limit T2. Optionally, the lower limit T1 may fall into a wavelength range from 600 nm to 800 nm, and the upper limit T2 is greater than T1 and may fall into a wavelength range from 750 nm to 1000 nm. Moreover, selection of T2 may follow a principle of filtering part of light having a relatively large spectrum response discrepancy among the R, G, B components and IR component while only retaining the part having a close spectrum response in the four components. In this case, after the RGBIR sensor 130 generates the first RGBIR image using the light filtered by the optical filter 120, the processor removes, for the first RGBIR image generated by the RGBIR sensor 130, IR component from the first RGBIR image to obtain an average luminance of the RGB image corresponding to the first RGBIR image, which may guarantee the RGB image having a relatively small spectrum response discrepancy among the R, G, B components.

Figure 4:
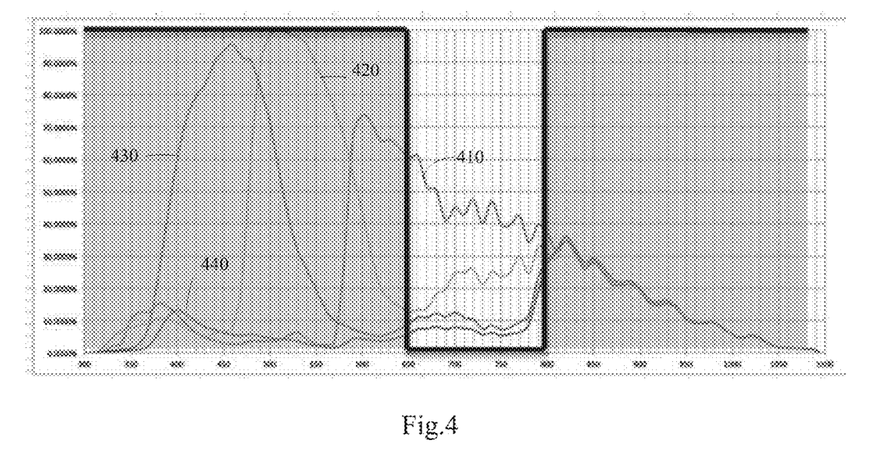
FIG. 4 is a schematic diagram of spectrum response of an optical filter.

Please refer to FIG. 4, which shows a schematic diagram of spectrum response of an optical filter. As shown in FIG. 4, respective curves in the figure show light energy magnitudes of R, G, B, and IR components at respective bands, wherein 410 represents the R component, 420 represents the G component. 430 represents the B component, and 440 represents the IR component; T1 and T2 represent the lower limit and the upper limit of a filter band of the optical filter, the shadow portions at two sides represent through bands, and the middle portion represents a filtered band. Particularly, the bold black line represents an ideal spectrum response curve of the optical filter. It needs to be noted that in practical applications, the actual filter response cannot reach vertical, and there will be a certain slope and fluctuation.

As an example of the present application, the processor 140 may be specifically configured to, use an interpolation method to determine an interpolated IR luminance value of an image element in the first RGBIR image, wherein the image element includes each image element of R component, G component, B component in the first RGBIR image corresponding to the image element of the IR component, and subtract the interpolated IR luminance value from the luminance value of the image element, to obtain an adjusted luminance value of the image element; and determine an average luminance of the RGB image corresponding to the first RGBIR image based on the adjusted luminance value of each image element of R component, G component, B component.

Figure 5:
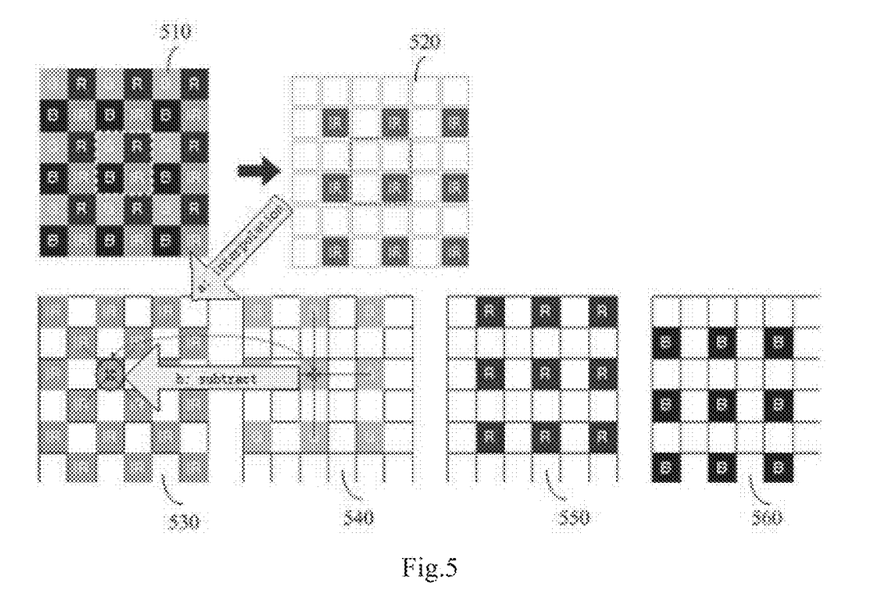
FIG. 5 is a schematic diagram of a process of determining a luminance value of each R, G, B image element of an RGBIR image using an interpolation method.

FIG. 5 is a schematic diagram of a process of determining the luminance value of each image element of R component, G component, B component in an RGBIR image using an interpolation method.

As illustrated in FIG. 5, 510 represents a schematic diagram of an RGBIR image outputted by the RGBIR sensor, 520 represents an IR image element lattice in the RGBIR image; the IR image element lattice shown in 520 is subjected to interpolation, the result of interpolation is shown in 530, 540, 550, and 560 represent an R image element lattice, a G image element lattice, and a B image element lattice corresponding to the RGBIR image shown in 510.

The interpolated IR luminance value, in the IR image element lattice shown in 530, corresponding to each image element in the R image element lattice shown in 540 is subtracted from the luminance value of the image element, to determine an adjusted luminance value of the image element in the R image element lattice; the interpolated IR luminance value, in the IR image element lattice shown in 530, corresponding to each image element in the G image element lattice shown in 550 is subtracted from the luminance value of the image element, to determine an adjusted luminance value of the image element in the G image element lattice; the interpolated IR luminance value, in the IR image element lattice shown in 530, corresponding to each image element in the B image element lattice shown in 560 is subtracted from the luminance value of the image element, to determine an adjusted luminance value of the image element in the B image element lattice.

It needs to be noted that in the embodiments of the present application, existing image interpolation algorithms such as proximal interpolation, linear interpolation may be adopted during the process of performing interpolation on the IR image element lattice shown in 520; this process will not be detailed in the embodiments of the present application.

As an example of the present application, the processor 140 may also be configured to determine a white balance gain of each RGB image, and generate a dehazed image according to the white balance gain of each RGB image, the first RGBIR image, and the second RGBIR image.

Specifically, the processor may partition, for the RGB images corresponding to each first RGBIR image, each RGB image into a plurality of small patches, and calculates an average luminance of each R, G, and B component of each small patch, so as to obtain the white balance gain of each RGB image according to the white balance algorithm; and further generate a dehazed image according to the white balance gain of the RGB image, the first RGBIR image, and the second RGBIR image.

In the embodiments of the present application, prior arts may be adopted during the process of obtaining the white balance gain of each RGB image according to the white balance algorithm and the process of generating a dehazed image according to the white balance gain of the RGB image, the first RGBIR image, and the second RGBIR image; therefore, the two processes will not be detailed in the embodiments of the present application.

As an example of the present application, when adjusting the first exposure time length, the processor 140 may determine whether the first difference value between an average luminance of the RGB image and the preconfigured first target luminance value is greater than a first threshold; if so, it may be indicated that the current average luminance of the RGB images is greater than the preconfigured first target luminance value; in this case, the first exposure time length may be shortened, causing the average luminance of the RGB image to be proximate to the preconfigured first target luminance value. When the first difference is smaller than a second threshold, it may be indicated that the current average luminance of the RGB image is smaller than the preconfigured first target luminance value; in this case, the first exposure time length may be prolonged.

For example, it may be preconfigured that the first target luminance value is 100, the first threshold is 10, and the second threshold is −10; when the first difference between the average luminance of the RGB image and the preconfigured first target luminance value is greater than the first threshold or smaller than the second threshold, the first exposure time length is adjusted; when the first difference value between the average luminance of the RGB image and the preconfigured first target luminance value is smaller than the first threshold and greater than the second threshold, the first exposure time length may not be adjusted. In other words, in practical applications, the luminance of the RGB image is required between 90 and 110.

In practical applications, due to objective existence of environment disturbance, if the first exposure time length is adjusted by comparison with only one target luminance value, the first exposure time length will keep oscillating around the target value. If two thresholds are set, when the average luminance of the RGB image falls within the range between the two thresholds, no adjustment need to be made, which may avoid the issue of oscillation.

Optionally, the processor 140 may shorten the first exposure time length with a first step size, e.g., 0.1 ms, 0.2 ms, etc.; and prolong the first exposure time length with a second step size, e.g., 0.1 ms, 0.2 ms, etc.; wherein the first step size and the second step size may be identical or different.

As an example of the present application, when adjusting the second exposure time length, the processor 140 may determine whether a second difference value between the average luminance of the IR image and the preconfigured second target luminance value is greater than a third threshold; if so, it may be indicated that the current average luminance of the IR image is greater than the preconfigured second target luminance value; in this case, the second exposure time length may be shortened; when the second difference is smaller than a fourth threshold, it may be indicated that the current average luminance of the IR image is smaller than the preconfigured second target luminance value; in this case, the second exposure time length may be prolonged.

For example, it may be preconfigured that the second target luminance value is 100, the third threshold is 10, and the fourth threshold is −10; when the second difference between the average luminance of the IR image and the preconfigured second target luminance value is greater than the third threshold or smaller than the fourth threshold, the second exposure time length is adjusted; when the second difference between the average luminance of the IR image and the preconfigured second target luminance value is smaller than the third threshold but greater than the fourth threshold, the second exposure time length may not be adjusted. In other words, in practical applications, the luminance of the IR image is only required between 90 and 110.

Due to objective existence of environment disturbance, if the second exposure time length is adjusted by comparison with only one target luminance value, the second exposure time length will keep oscillating around the target value. If two thresholds are set, when the average luminance of the RGB image falls within the range between the two thresholds, no adjustment need to be made, which may avoid the issue of oscillation.

Optionally, the processor 140 may shorten the second exposure time length with the third step size, e.g., 0.1 ms, 0.2 ms, etc.; and prolong the second exposure time length with the fourth step size, e.g., 0.1 ms, 0.2 ms, and etc.; wherein the third step size and the fourth step size may be identical or different.

Figure 6:
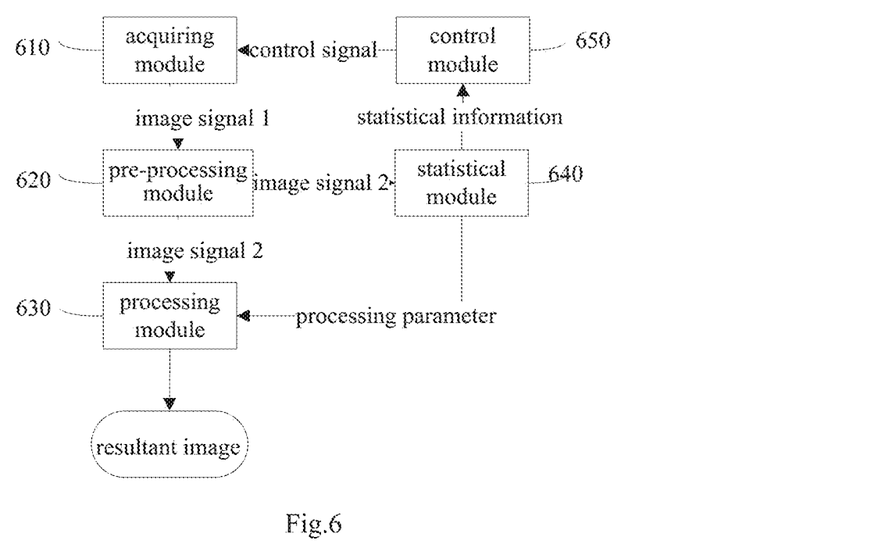
FIG. 6 is a structural schematic diagram of an image dehazing apparatus according to an embodiment of the present application.

As an example of the present application, the image acquiring apparatus according to the embodiments of the present application may be configured as an image dehazing apparatus shown in FIG. 6. As shown in FIG. 6, the image dehazing apparatus may include: an acquiring module 610, a pre-processing module 620, a processing module 630, a statistical module 640, and a control module 650.

Specifically, the acquiring module 610 may include a lens 110, an optical filter 120, and an RGBIR sensor 130 in the image acquiring apparatus shown in FIG. 1, the lens is configured for converging visible light and infrared light, and the optical filter is configured for filtering the converged visible light and infrared light to filter out a near-infrared visible light transition band from the visible light and infrared light; the RGBIR sensor is configured for sensing the filtered visible light and infrared light according to a first exposure time length stored during at least one exposure in each round of exposure process, to generate a first RGBIR image; and sensing the filtered visible light and the filtered infrared light according to a second exposure time length stored during at least one exposure in the round of exposure process, to thereby generate a second RGBIR image.

The pre-processing module 620, the processing module 630, the statistical module 640, and the control module 650 may constitute the processor 140 in the image acquiring apparatus shown in FIG. 1.

Particularly, the pre-processing module 620 may obtain, for each first RGBIR image (i.e., image signal 1) acquired by the acquiring module 610, an image signal 2 by removing an IR component from the first RGBIR image; specifically, in an embodiment of the present application, the acquiring module 610 may acquire at least two RGBIR images, e.g., a first RGBIR image and a second RGBIR image, and transmit both of the first RGBIR image and second RGBIR image to the pre-processing module 620; after the pre-processing module transmits respective processed image signals 2 to the processing module 630, the processing module 630 may generate a resultant image (namely, a dehazed image) using the HDR/WDR technology based on the respective image signals 2.

The pre-processing module 620 may also transmit the processed image signals 2 to the statistical module 640; the statistical module 640 may be configured to obtain the average luminance of the RGB image corresponding to each first RGBIR image, and obtain the average luminance of the IR image corresponding to each second RGBIR.

The statistical module 640, after obtaining the average luminance of each RGB image and the average luminance of the IR image, may transmit the result to the control module 650; the control module 650 may adjust the first exposure time length for the acquiring module 610 to acquire the first RGBIR image based on the average luminance of the RGB image and the preconfigured first target luminance value, adjust the second exposure time length for the acquiring module 610 to acquire the second RGBIR image based on the average luminance of the IR image and the preconfigured second target luminance value, and may transmit the adjusted exposure time lengths to the acquiring module 610, such that the acquiring module 610 may acquire the first RGBIR image and the second RGBIR image based on the adjusted first exposure time length and second exposure time length.

Figure 7:
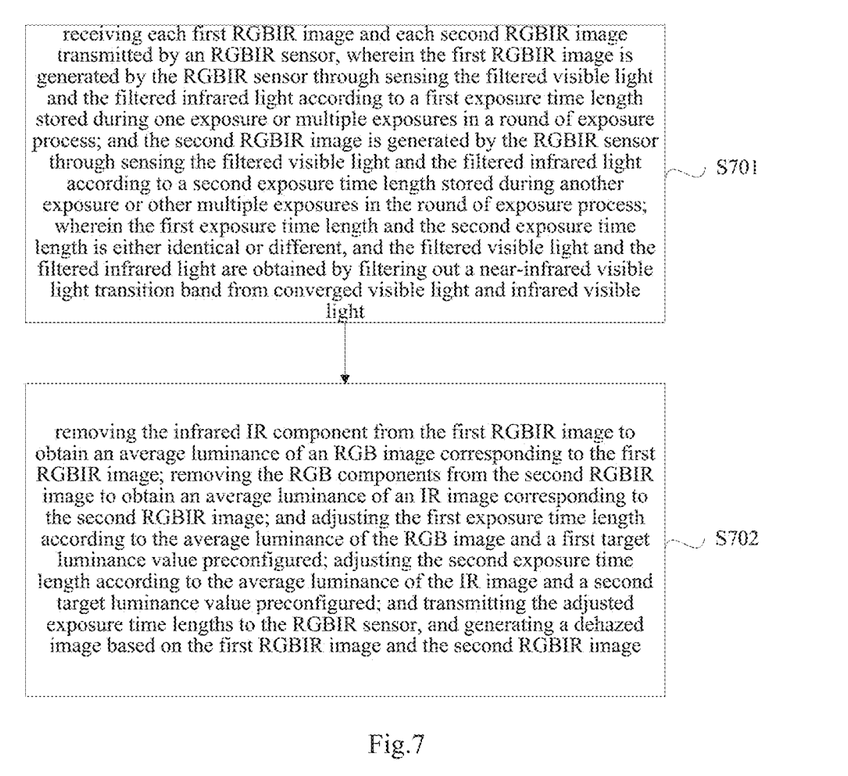
FIG. 7 is a schematic flow diagram of an image dehazing method provided in an embodiment of the present application.

Correspondingly, an embodiment of the present application further provides an image dehazing method. As shown in FIG. 7, the method may include:

S701: receiving each first RGBIR image and each second RGBIR image transmitted by an RGBIR sensor, wherein the first RGBIR image is generated by the RGBIR sensor through sensing the filtered visible light and the filtered infrared light according to a first exposure time length stored during one exposure or multiple exposures in a round of exposure process; and the second RGBIR image is generated by the RGBIR sensor through sensing the filtered visible light and the filtered infrared light according to a second exposure time length stored during another exposure or other multiple exposures in the round of exposure process; wherein the first exposure time length and the second exposure time length is either identical or different, and the filtered visible light and the filtered infrared light are obtained by filtering out a near-infrared visible light transition band from converged visible light and infrared visible light.

The method provided by an embodiment of the present application may be applied to an image acquiring apparatus, and may specifically be applied to a processor in the image acquiring apparatus. Moreover, the image acquiring apparatus in the embodiments of the present application may further include an RGBIR sensor.

The RGBIR sensor is an image sensor and also a CMOS sensor. Different from a traditional image sensor that outputs Bayer pattern data, the RGBIR sensor transforms half of green through image elements into infrared through image elements, thereby sacrificing half of green channel information for an independent near-infrared channel (with a sensible wavelength ranging about 800-1000 nm) information.

In an embodiment of the present application, the RGBIR sensor may pre-save a first exposure time length and a second exposure time length, wherein the first exposure time length and the second exposure time length may be identical or different. Further, the RGBIR sensor may perform more than twice exposures during each round of exposure process according to the stored first exposure time length and second exposure time length. Specifically, the RGBIR sensor may sense the filtered visible light and infrared light according to the stored first exposure time length during at least one exposure in each round of exposure process, to thereby generate a first RGBIR image; and sense the filtered visible light and infrared light according to the stored second exposure time length during another exposure in the round of exposure process, to thereby generate a second RGBIR image. Particularly, the filtered visible light and infrared light are obtained by filtering out the near-infrared visible light transition band from the converged visible light and infrared light. The near-infrared visible light transition band may be a band ranging from 600 nm to 1000 nm.

Therefore, in an embodiment of the present application, the processor of the image acquiring apparatus may receive the first RGBIR image and the second RGBIR image transmitted by the RGBIR sensor to generate a dehazed image based on the first RGBIR image and second RGBIR image.

S702, removing the infrared IR component from the first RGBIR image to obtain an average luminance of an RGB image corresponding to the first RGBIR image; removing the RGB components from the second RGBIR image to obtain an average luminance of an IR image corresponding to the second RGBIR image; and adjusting the first exposure time length according to the average luminance of the RGB image and a first target luminance value preconfigured; adjusting the second exposure time length according to the average luminance of the IR image and a second target luminance value preconfigured; and transmitting the adjusted exposure time lengths to the RGBIR sensor, and generating a dehazed image based on the first RGBIR image and the second RGBIR image.

In an embodiment of the present application, after receiving each first RGBIR image and each second RGBIR image transmitted by the RGBIR sensor, the processor may remove the IR component from the first RGBIR image to obtain the average luminance of the RGB image corresponding to the first RGBIR image; remove the RGB components from the second RGBIR image to obtain the average luminance of the IR image corresponding to the second RGBIR image; and adjust the first exposure time length based on the average luminance of the RGB image and the preconfigured first target luminance value; adjust the second exposure time length based on the average luminance of the IR image and the preconfigured second target luminance value; transmit the adjusted exposure time lengths to the RGBIR sensor; and generate the dehazed image based on the first RGBIR image and the second RGBIR image.

Specifically, in an embodiment of the present application, the processor may generate the dehazed image using the HDR/WDR image generating method based on the first RGBIR image and the second RGBIR image.

When acquiring an image containing a scene with a relatively large dynamic range, some local parts in the image may be too dark, while some other local parts may be overexposed. Therefore, to obtain an image having a good result, two or more images having a same photography scene but different luminance may be obtained through two or more exposures with different time lengths during one round of exposure process. Because each exposure has a different time length, ideal information content may be obtained based on local features with different luminance in respective images. Then, by combining the information contained in the images, a final image with extended dynamic range and enhanced details may be obtained. This method may be referred to as an HDR/WDR image generating method.

When generating a dehazed image using the HDR/WDR image generating method, quality of the first RGBIR image and second RGBIR image is an important factor that affects the display effect of the final dehazed image. For example, when the RGB components and the IR component in the image reach a balance, the display effect of the dehazed image may be enhanced. In turn, the first exposure time length and the second exposure time length are also important factors affecting the quality of the first RGBIR image and the second RGBIR image. Therefore, in an embodiment of the present application, the processor in the image acquiring device may adjust the first exposure time length and the second exposure time length so as to cause the RGB components and the IR component in the image to be balanced. Moreover, the adjusted first exposure time length and second exposure time length may be transmitted to the RGBIR sensor such that the RGBIR sensor may generate the first RGBIR image and the second RGBIR image according to the adjusted first exposure time length and second exposure time length, thereby enhancing the quality of the first RGBIR image and the second RGBIR image; further, when the processor generates the dehazed image based on the first RGBIR image and the second RGBIR image, the display effect of the dehazed image may be enhanced.

Specifically, the processor may remove, for each first RGBIR image generated by the RGBIR sensor, the IR component from the first RGBIR image to obtain an average luminance of an RGB image corresponding to the first RGBIR image; remove, for each second RGBIR image generated by the RGBIR sensor, the RGB components from the second RGBIR image to obtain an average luminance of an IR image corresponding to the second RGBIR image; adjust the first exposure time length according to the average luminance of the RGB image and the preconfigured first target luminance value; and adjust the second exposure time length according to the average luminance of the IR image and the preconfigured second target luminance value.

It needs to be noted that in practical applications, the processor may adjust the corresponding first exposure time length and second exposure time length for the first RGBIR image and the second RGBIR image generated by the RGBIR sensor, and transmit the adjusted first exposure time length and second exposure time length to the RGBIR sensor; after the RGBIR sensor generates a new first RGBIR image and a new second RGBIR image using the adjusted first exposure time length and second exposure time length, the processor may further adjust the current first exposure time length and second exposure time length according to the new first RGBIR image and second RGBIR image. With such a cycle going on and on, the first exposure time length and the second exposure time length may reach stable values. Moreover, after the RGBIR sensor generates a first RGBIR image and a second RGBIR image according to the stable first exposure time length and second exposure time length, the RGB components and the IR component in the dehazed image generated by the processor based on the first RGBIR image and the second RGBIR image may reach a balance, thereby achieving a good display effect.

An embodiment of the present application provides an image dehazing method applied to an image acquiring apparatus, wherein an optical filter in the image acquiring apparatus filters visible light and infrared light converged by a lens to filter out a near-infrared visible light transition band from the visible light and infrared light; during at least one exposure in each round of exposure process, the RGBIR sensor generates a first RGBIR image based on a first exposure time length and generates a second RGBIR image according to a second exposure time length; the processor adjusts the first exposure time length of the RGBIR sensor according to an average luminance of the RGB image corresponding to the first RGBIR image and the preconfigured first target luminance value, adjusts the second exposure time length of the RGBIR sensor according to an average luminance of the IR image corresponding to the second RGBIR image and a preconfigured second target luminance value, and generates a dehazed image according to the first RGBIR image and the second RGBIR image. Because the RGBIR sensor is adopted in the embodiments of the present application to generate the first RGBIR image and the second RGBIR image, the generated images are color images containing infrared information, such that the finally generated image has a relatively good dehazing effect. Additionally, the image acquiring apparatus adjusts the first exposure time length and the second exposure time length based on the first RGBIR image and the second RGBIR image generated during each exposure, thereby causing the RGB components and the IR component in the image to reach a balance, which guarantees the display effect of the finally generated dehazed image.

As an example of the present application, the processor is may subtract the infrared IR component from the first RGBIR image to obtain an average luminance of an RGB image corresponding to the first RGBIR image; determine an interpolated IR luminance value of an image element in the first RGBIR image using an interpolation method, wherein the image element includes each image element of R component, G component, B component in the first RGBIR image corresponding to the image element of the IR component; then subtract an interpolated IR luminance value corresponding to each image element of R component, G component, B component from the luminance value of the image element, to determine an adjusted luminance value of the image element; and determine an average luminance of the RGB image corresponding to the first RGBIR image based on the adjusted luminance value of each image element of R component, G component, B component.

As an example of the present application, for each first RGBIR image, when determining an average luminance of the RGB image corresponding to the first RGBIR image based on the adjusted luminance value of each image element of R component, G component, B component, the average luminance of the RGB image corresponding to the first RGBIR image may be determined based on the adjusted luminance value of each image element of R component, G component, B component and a preconfigured weight value corresponding to each image element.

As an example of the present application, when generating a dehazed image based on each first RGBIR image and each second RGBIR image, the processor may firstly determine the white balance gain of each RGB image, and then generate the dehazed image based on the white balance gain of each RGB image, the first RGBIR image, and the second RGBIR image.

Specifically, the processor may partition, for each first RGBIR image, each RGB image into a plurality of small patches, and calculates an average luminance of each R. G, and B component of each small patch, so as to obtain the white balance gain of the RGB image according to the white balance algorithm; and further generate a dehazed image based on the white balance gain of each RGB image, the first RGBIR image, and the second RGBIR image. In an embodiment of the present application, prior arts may be adopted during the process of obtaining the white balance gain of each RGB image based on the white balance algorithm and the process of generating a dehazed image based on the white balance gain of the RGB image, the first RGBIR image, and the second RGBIR image; therefore, the two processes will not be detailed in the embodiments of the present application.

As an example of the present application, when adjusting the first exposure time length based on the average luminance of the RGB image and the preconfigured first target luminance value, the processor may specifically determine whether a first difference value between the average luminance of the RGB image and a preconfigured first target luminance value is greater than a first threshold; if so, shorten the first exposure time length; when the first difference value is smaller than a second threshold, prolong the first exposure time length.

When the processor determines that the first difference value between the average luminance of the RGB image and the preconfigured first target luminance value is greater than the first threshold, it may be indicated that the current average luminance of the RGB image is greater than the preconfigured first target luminance value; in this case, the first exposure time length may be shortened, causing the average luminance of the RGB image to be proximate to the preconfigured first target luminance value. When the first difference value is smaller than the second threshold, it may be indicated that the current average luminance of the RGB image is smaller than the preconfigured first target luminance value; in this case, the first exposure time length may be prolonged.

Optionally, the processor may shorten the first exposure time length with the first step size. e.g., 0.1 ms, 0.2 ms, etc.; and prolong the first exposure time length with the second step size, e.g., 0.1 ms, 0.2 ms, etc., wherein the first step size and the second step size may be identical or different.

As an example of the present application, when adjusting the second exposure time length based on the average luminance of the IR image and the preconfigured second target luminance value, the processor may specifically determine whether a second difference value between the average luminance of the IR image and the preconfigured second target luminance is greater than a third threshold; if so, shorten the second exposure time length, when the second difference is smaller than a fourth threshold, prolong the second exposure time length.

When the processor determines that the second difference value between the average luminance of the IR image and the preconfigured second target luminance value is greater than the third threshold, it may be indicated that the current average luminance of the IR image is greater than the preconfigured second target luminance value; in this case, the second exposure time length may be shortened. When the second difference is smaller than the fourth threshold, it may be indicated that the current average luminance of the IR image is smaller than the preconfigured second target luminance value; in this case, the second exposure time length may be prolonged.

Optionally, the processor may shorten the second exposure time length with a third step size, e.g., 0.1 ms, 0.2 ms, etc., and prolong the second exposure time length with a fourth step size. e.g., 0.1 ms, 0.2 ms, etc., wherein the third step size and the fourth step size may be identical or different.

Embodiments of the present application provide an image dehazing method and an image acquiring apparatus implementing image dehazing, wherein the optical filter in the image acquiring apparatus filters visible light and infrared light converged by a lens to filter out a near-infrared visible light transition band from the visible light and infrared light; the RGBIR sensor, during at least one exposure in each round of exposure process, generates a first RGBIR image according to a first exposure time length, and generates a second RGBIR image according to a second exposure time length; the processor adjusts the first exposure time length of the RGBIR sensor based on the average luminance of the RGB image corresponding to the first RGBIR image and the preconfigured first target luminance value, adjusts the second exposure time length of the RGBIR sensor based on the average luminance of the IR image corresponding to the second RGBIR image and the preconfigured second target luminance value, and generates a dehazed image according to the first RGBIR image and the second RGBIR image. Because the embodiments of the present application adopt an RGBIR sensor to generate the first RGBIR image and the second RGBIR image, thus the generated images are color images and contain infrared information, such that the finally generated image has a good dehazing effect; additionally, the image acquiring apparatus adjusts the first exposure time length and the second exposure time length based on the first RGBIR image and the second RGBIR image generated during each exposure, causing the RGB components and the IR component in the images to be balanced, which guarantees the display effect of the finally generated dehazed image.

Correspondingly, the present application further provides a storage medium, wherein the storage medium is configured for storing executable codes, the executable codes can implement an image dehazing method according to the present application when being executed, wherein the image dehazing method of the present application includes:

receiving each first RGBIR image and each second RGBIR image transmitted by an RGBIR sensor, wherein the first RGBIR image is generated by the RGBIR sensor through sensing the filtered visible light and the filtered infrared light according to a first exposure time length stored during one exposure or multiple exposures in a round of exposure process; and the second RGBIR image is generated by the RGBIR sensor through sensing the filtered visible light and the filtered infrared light according to a second exposure time length stored during another exposure or other multiple exposures in the round of exposure process; wherein the first exposure time length and the second exposure time length is either identical or different, and the filtered visible light and the filtered infrared light are obtained by filtering out a near-infrared visible light transition band from converged visible light and infrared visible light; and removing the infrared IR component from the first RGBIR image to obtain an average luminance of an RGB image corresponding to the first RGBIR image; removing the RGB components from the second RGBIR image to obtain an average luminance of an IR image corresponding to the second RGBIR image; and adjusting the first exposure time length according to the average luminance of the RGB image and a first target luminance value preconfigured; adjusting the second exposure time length according to the average luminance of the IR image and a second target luminance value preconfigured; and transmitting the adjusted exposure time lengths to the RGBIR sensor, and generating a dehazed image based on the first RGBIR image and the second RGBIR image.

The embodiments of the present application adopt an RGBIR sensor to generate the first RGBIR image and the second RGBIR image, the generated images are color images and contain infrared information, such that the finally generated image has a good dehazing effect; additionally, the image acquiring device adjusts the first exposure time length and the second exposure time length based on the first RGBIR image and the second RGBIR image generated during each exposure, causing the RGB components and the IR component in the image to be balanced, which guarantees the display effect of the finally generated dehazed image.

Correspondingly, the present application further provides an application which, implements an image dehazing method of the present application when being executed, wherein the image dehazing method of the present application includes:

receiving each first RGBIR image and each second RGBIR image transmitted by an RGBIR sensor, wherein the first RGBIR image is generated by the RGBIR sensor through sensing the filtered visible light and the filtered infrared light according to a first exposure time length stored during one exposure or multiple exposures in a round of exposure process; and the second RGBIR image is generated by the RGBIR sensor through sensing the filtered visible light and the filtered infrared light according to a second exposure time length stored during another exposure or other multiple exposures in the round of exposure process; wherein the first exposure time length and the second exposure time length is either identical or different, and the filtered visible light and the filtered infrared light are obtained by filtering out a near-infrared visible light transition band from converged visible light and infrared visible light; and removing the infrared IR component from the first RGBIR image to obtain an average luminance of an RGB image corresponding to the first RGBIR image; removing the RGB components from the second RGBIR image to obtain an average luminance of an IR image corresponding to the second RGBIR image; and adjusting the first exposure time length according to the average luminance of the RGB image and a first target luminance value preconfigured; adjusting the second exposure time length according to the average luminance of the IR image and a second target luminance value preconfigured; and transmitting the adjusted exposure time lengths to the RGBIR sensor, and generating a dehazed image based on the first RGBIR image and the second RGBIR image.

The embodiments of the present application adopt an RGBIR sensor to generate the first RGBIR image and the second RGBIR image, the generated images are color images and contain infrared information, such that the finally generated image has a good dehazing effect; additionally, the image acquiring device adjusts the first exposure time length and the second exposure time length based on the first RGBIR image and the second RGBIR image generated during each exposure, causing the RGB components and the IR component in the image to be balanced, which guarantees the display effect of the finally generated dehazed image.

For method/storage medium/application embodiments, because they are substantially similar to the apparatus embodiments, therefore they are described relatively simple, and for relevant parts refer to part of description of the apparatus embodiments.

It needs to be noted that the relational terms used herein such as first and second are only used to distinguish one entity or operation from the other entity or operation, not necessarily requiring or implying that these entities or operations have any such practical relationship or sequence. Moreover, the terms "include". "comprise" or any variants thereof are intended to cover a non-exclusive inclusion, such that processes, methods, articles or devices including a series of elements include not only those elements listed, but also other elements not listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

Various embodiments in the present application are all described using relevant manners. Same and similar parts between various embodiments may be referenced to each other. Each embodiment focuses on differences with other embodiments. Particularly, for the apparatus embodiment, because it is substantially similar to the method embodiment, the description is relatively simple, and related parts may refer to part of description of the method embodiment.

It can be understood by a person skilled in the art that all or a part of steps in the implementations of the above method can be carried out by related hardware being instructed by programs, which can be stored in computer readable storage medium, such as ROM/RAM, disk and optical disk etc.

The embodiments described above are just preferable embodiments of the present application, and not indented to limit the present application. Any modifications, alternatives, improvements or the like within the spirit and principle of the present application shall be included in the protection scope of the present application.

What is claimed is:

1. An image acquiring apparatus implementing image dehazing, comprising:
    a lens, configured to converge visible light and infrared light;
    an optical filter, configured to filter the converged visible light and infrared light to filter out a near-infrared visible transition band from the visible light and infrared light;
    an RGBIR sensor, configured to sense the filtered visible light and the filtered infrared light according to a first exposure time length stored during one exposure or multiple exposures in a round of exposure process, to generate a first RGBIR image; and sense the filtered visible light and the filtered infrared light according to a second exposure time length stored during another exposure or other multiple exposures in the round of exposure process, to generate a second RGBIR image; wherein the first exposure time length and the second exposure time length is either identical or different;
    a processor, configured to remove the infrared IR component from the first RGBIR image, to obtain an average luminance of an RGB image corresponding to the first RGBIR image; remove the RGB components from the second RGBIR image to obtain an average luminance of an IR image corresponding to the second RGBIR image; and adjust the first exposure time length according to the average luminance of the RGB image and a first target luminance value preconfigured; and adjust the second exposure time length according to the average luminance of the IR image and a second target luminance value preconfigured; and transmit the adjusted exposure time lengths to the RGBIR sensor, and generate a dehazed image based on the first RGB IR image and the second RGB IR image.

2. The image acquiring apparatus according to claim 1, wherein the near-infrared visible light transition band refers to a band ranging from 600 nm to 1000 nm.

3. The image acquiring apparatus according to claim 1, wherein the processor is configured to, use an interpolation method to determine an interpolated IR luminance value of an image element in the first RGBIR image, wherein the image element includes each image element of R component, G component, B component in the first RGBIR image corresponding to the image element of the IR component; and subtract the interpolated IR luminance value from the luminance value of the image element, to obtain an adjusted luminance value of the image element; and determine an average luminance of the RGB image corresponding to the first RGBIR image based on the adjusted luminance value of each image element of R component, G component, B component.

4. The image acquiring apparatus according to claim 1, wherein the processor is configured to, determine a white balance gain of the RGB image, and generate the dehazed image based on the white balance gain of the RGB image, the first RGBIR image and the second RGBIR image.

5. The image acquiring apparatus according to claim 1, wherein the processor is configured to, shorten the first exposure time length if the first difference value between the average luminance of the RGB image and the first target luminance value is greater than a first threshold; or prolong the first exposure time length when the first difference value is smaller than a second threshold, wherein the first threshold is greater than the second threshold.

6. The image acquiring apparatus according to claim 5, wherein the processor is configured to, shorten the first exposure time length with a first step size, or prolong the first exposure time length with a second step size, wherein the first step size and the second step size is either identical or different.

7. The image acquiring apparatus according to claim 1, wherein the processor is configured to, shorten the second exposure time length if the second difference value between the average luminance of the IR image and the second target luminance value is greater than a third threshold; or prolong the second exposure time length when the second difference value is smaller than a fourth threshold, wherein the third threshold is greater than the fourth threshold.

8. The image acquiring apparatus according to claim 7, wherein the processor is configured to, shorten the second exposure time length with a third step size, or prolong the second exposure time length with a fourth step size, wherein the third step size and the fourth step size is either identical or different.

9. An image dehazing method, applied to an image acquiring apparatus, the method comprising:
receiving each first RGBIR image and each second RGBIR image transmitted by an RGBIR sensor, wherein the first RGBIR image is generated by the RGBIR sensor through sensing the filtered visible light and the filtered infrared light according to a first exposure time length stored during one exposure or multiple exposures in a round of exposure process; and the second RGBIR image is generated by the RGBIR sensor through sensing the filtered visible light and the filtered infrared light according to a second exposure time length stored during another exposure or other multiple exposures in the round of exposure process; wherein the first exposure time length and the second exposure time length is either identical or different, and the filtered visible light and the filtered infrared light are obtained by filtering out a near-infrared visible light transition band from converged visible light and infrared visible light; and
removing the infrared IR component from the first RGBIR image to obtain an average luminance of an RGB image corresponding to the first RGBIR image;
removing the RGB components from the second RGBIR image to obtain an average luminance of an IR image corresponding to the second RGBIR image; and adjusting the first exposure time length according to the average luminance of the RGB image and a first target luminance value preconfigured; adjusting the second exposure time length according to the average luminance of the IR image and a second target luminance value preconfigured; and transmitting the adjusted exposure time lengths to the RGBIR sensor, and generating a dehazed image based on the first RGBIR image and the second RGBIR image.

10. The method according to claim 9, wherein the near-infrared visible light transition band refers to a band ranging from 600 nm to 1000 nm.

11. The method according to claim 9, wherein, removing the infrared IR component from the first RGBIR image to obtain an average luminance of an RGB image corresponding to the first RGBIR image, comprising:
determining an interpolated IR luminance value of an image element in the first RGBIR image using an interpolation method, wherein the image element includes each image element of R component, G component, B component in the first RGBIR image corresponding to the image element of the IR component;
subtracting the interpolated IR luminance value from the luminance value of the image element, to obtain an adjusted luminance value of the image element; and
determining an average luminance of the RGB image corresponding to the first RGBIR image based on the adjusted luminance value of each image element of R component, G component, B component.

12. The method according to claim 11, wherein, determining an average luminance of the RGB image corresponding to the first RGBIR image based on the adjusted luminance value of each image element of R component, G component, B component, comprises:
determining an average luminance of the RGB image corresponding to the first RGBIR image based on the adjusted luminance value of each image element of R component, G component, B component and a preconfigured weight value corresponding to the image element.

13. The method according to claim 9, wherein, generating a dehazed image based on the first RGBIR image and the second RGBIR image, comprising:
determining a white balance gain of the RGB image, and generating the dehazed image based on the white balance gain of the RGB image, the first RGBIR image and the second RGBIR image.

14. The method according to claim 9, wherein, adjusting the first exposure time length according to the average luminance of the RGB image and a first target luminance value preconfigured, comprising:
shortening the first exposure time length if the first difference value between the average luminance of the RGB image and the first target luminance value is greater than a first threshold; or
prolonging the first exposure time length when the first difference value is smaller than a second threshold, wherein the first threshold is greater than the second threshold.

15. The method according to claim 14, wherein the first exposure time length is shortened with a first step size, or the first exposure time length is prolonged with a second step size, wherein the first step size and the second step size is either identical or different.

16. The method according to claim 9, wherein, adjusting the second exposure time length according to the average luminance of the IR image and a second target luminance value preconfigured, comprising:
   shortening the second exposure time length if the second difference value between the average luminance of the IR image and the second target luminance value is greater than a third threshold; or
   prolonging the second exposure time length when the second difference value is smaller than a fourth threshold, wherein the third threshold is greater than the fourth threshold.

17. The method according to claim 16, wherein the second exposure time length is shortened with a third step size, or the second exposure time length is prolonged with a fourth step size, wherein the third step size and the fourth step size is either identical or different.

18. A non-transitory storage medium, wherein the storage medium is configured for storing executable codes, the executable codes are configured for implementing the image dehazing method according to claim 9 when being executed.

* * * * *